United States Patent [19]
Hernandez, Jr.

[11] 3,852,710
[45] Dec. 3, 1974

[54] AIRCRAFT GYROHORIZON INDICATOR WITH SIGNAL LAMP POSITIONAL ATTITUDE INDICATING MEANS

[75] Inventor: Ralph Hernandez, Jr., Miami, Fla.

[73] Assignee: Aircraft Instruments, Inc., Miami Beach, Fla.

[22] Filed: June 13, 1972

[21] Appl. No.: 272,935

Related U.S. Application Data
[63] Continuation of Ser. No. 854,633, Sept. 2, 1969, abandoned.

[52] U.S. Cl. .......................................... 340/27 AT
[51] Int. Cl. ................................................ G08g 5/00
[58] Field of Search ............................. 340/27 AT

[56] References Cited
UNITED STATES PATENTS
3,723,963   3/1973   Hernandez ................ 340/27 AT
3,737,846   6/1973   Hernandez ................ 340/27 AT

*Primary Examiner*—Ralph D. Blakeslee
*Attorney, Agent, or Firm*—Ernest H. Schmidt

[57] ABSTRACT

A combination gyrohorizon instrument for aircraft which visually indicates in addition to the dial display presentation of the instrument, by means of signal lamps appropriately placed with respect to the instrument dial and an audible signal indicative of energization of any one of the signal lamps, departures from straight and level flight that exceed reasonable limits of pitch and bank. The signal lamps, indicating "nose up," "nose down," "left wing down" and "right wing down" are in circuits energized by a first switching means controlled by the relative rotational position of the inner and outer gimbals of the instrument for sensing departure beyond reasonable safety limits in one direction or the other in the pitch axis, i.e., either "nose up" or "nose down" flight, and a second switch means controlled by the relative rotation position of the outer gimbal and the instrument casing for sensing departure beyond reasonable limits in the roll axis, i.e., either "left wing down" or "right wing down" flight.

2 Claims, 9 Drawing Figures

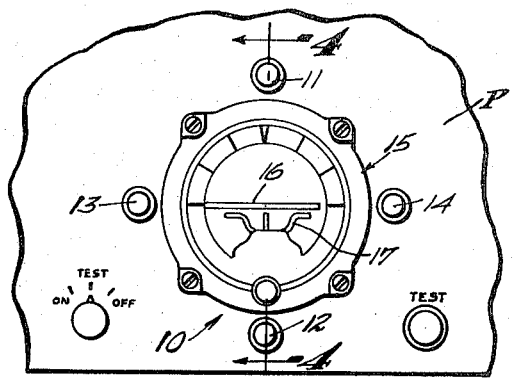
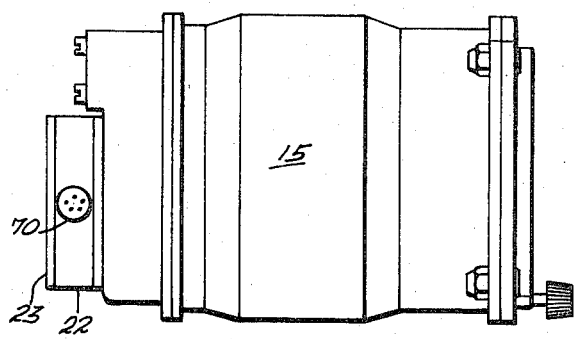
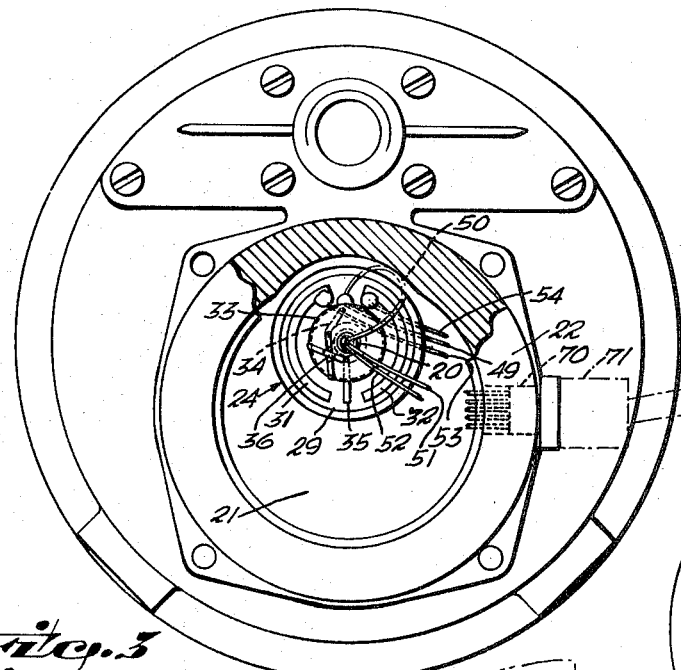
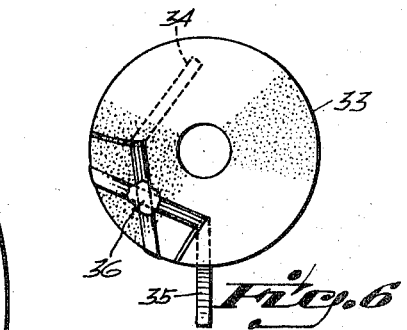
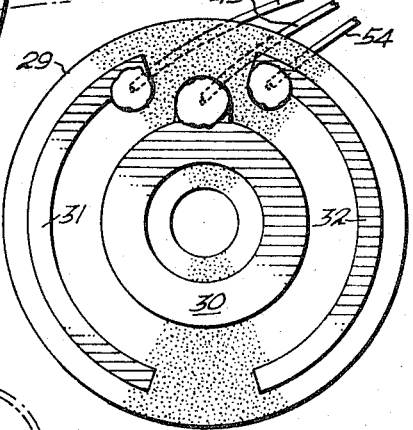
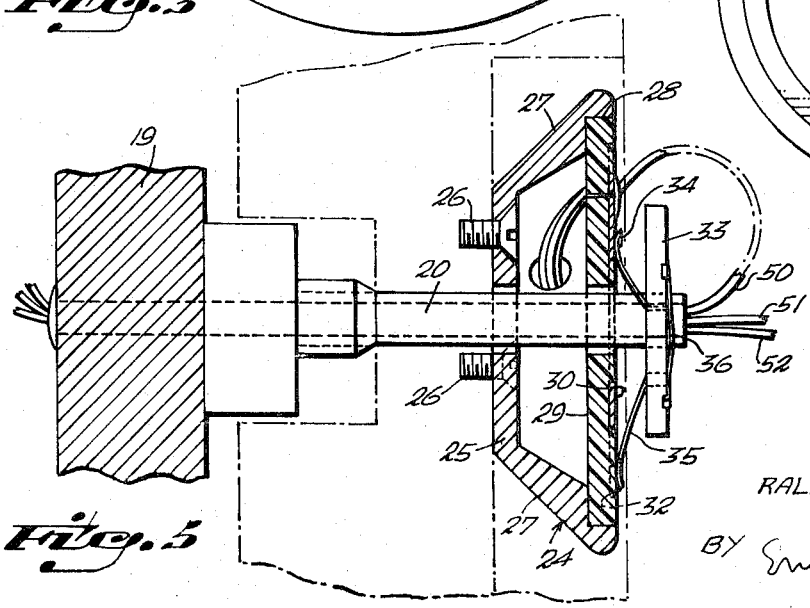
INVENTOR.
RALPH HERNANDEZ JR.

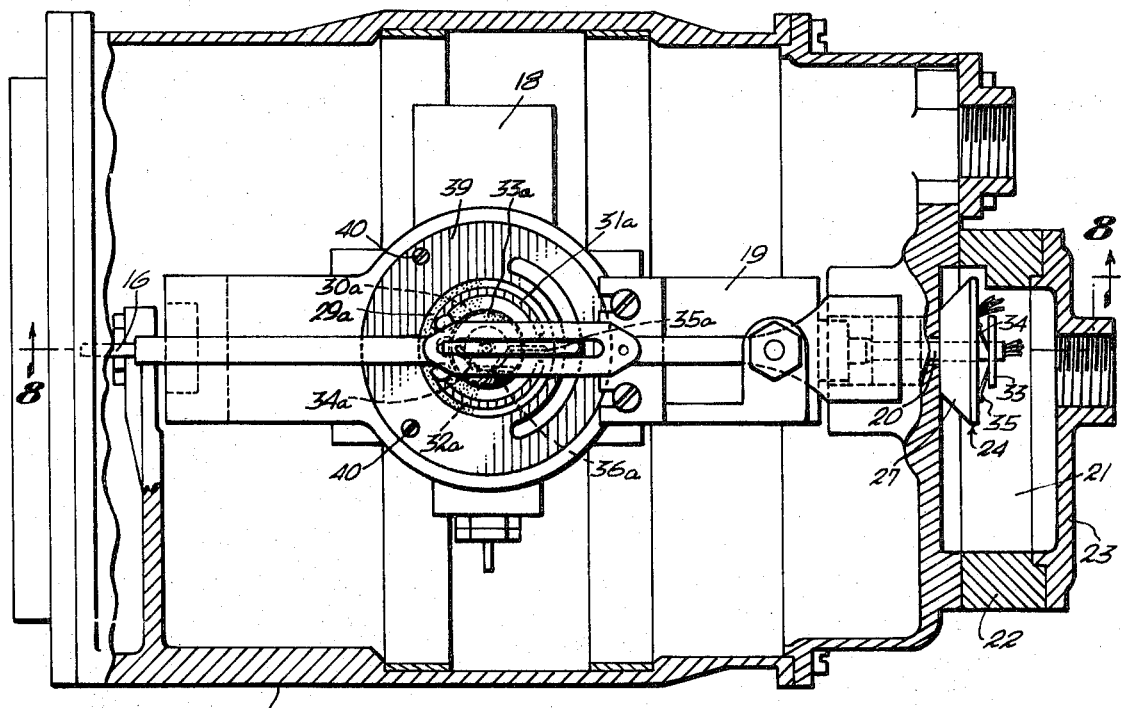
Fig. 4
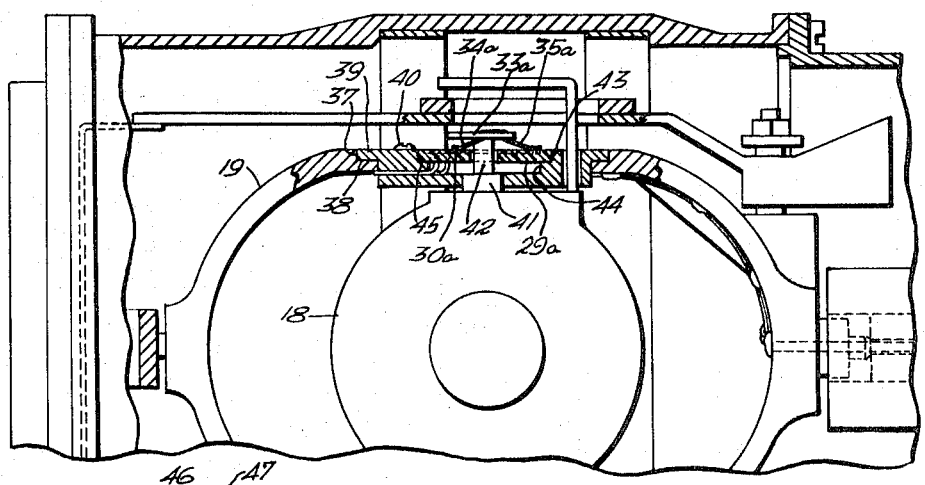
Fig. 8
Fig. 9
INVENTOR.
RALPH HERNANDEZ JR.
BY Ernest A Schmidt
ATTORNEY.

AIRCRAFT GYROHORIZON INDICATOR WITH SIGNAL LAMP POSITIONAL ATTITUDE INDICATING MEANS

This is a continuation, of application Ser. No. 854,633, filed 9-2-69 now abandoned.

This application is a continuation-in-part of U.S. Pat. Application Ser. No. 813,252, filed April 3, 1969, entitled Aircraft Gyrohorizon Indicator With Signal Lamp Positional Attitude Indicating Means.

This invention relates to flight control instruments and is directed to improvements in gyroscopic instruments such as artificial horizon instruments whereby the positional attitude of the aircraft when departing beyond pre-determined acceptable limits from straight and level flight, in addition to being displayed in the usual manner on the instrument dial, is indicated by the selective energization of appropriately located signal lamps in the instrument panel. In the above-identified parent application, there is described a combination gyrohorizon instrument of the character described wherein the signal lamp switching is effected by the provision of a first slip ring switch means controlled by the relative rotational position of the inner gimbal and the outer gimbal for sensing departure beyond reasonable limits in the pitch axis, and a second slip ring means controlled by the relative rotational position of the outer gimbal and the instrument casing for sensing departure beyond reasonable limits in the roll axis. In that application, the slip ring switch means comprises circumferential slip ring contact means fixed for rotation with the respective inner and outer gimbal axes and relatively fixed elongated brush members arranged to make sliding contact with their respective circumferential slip rings. It is the principal object of the present invention to provide a sturdier, more dependable switching mechanism for sensing departure beyond reasonable limits in the pitch and roll axes.

A more particular object is to provide an improved combination gyro-controlled instrument of the character described wherein, instead of using slip ring contactor means on the pivotal axes of the inner and outer gimbals, slip contacts in the form of flat contact discs having concentric arcuate segmental conductive surface portions are utilized, fixed with respect to the rotary axes, in association with contactor disc members fixed with respect to the pivotal axes or spindles of the inner and outer gimbals and arranged in closely-spaced disposition with respect to their associated contact discs, said contactor disc members having short contacting brushes appropriately placed and interconnected to be in sliding contact with their associated contact discs' conductive segments.

Still another object of the invention is to provide a warning device of the above nature including audible signal means in addition to the visual signal lamps, operative when any one of the signal lamps is energized to immediately warn the pilot of deviation from a normal flight path or attitude in the event that his attention is directed away from the instrument panel at that moment.

Yet another object is to provide a flight control indicator of the character described which will not present a warning indication under normal flight conditions, but which will indicate abnormal or dangerous maneuvers.

Other objects, features and advantages of the invention will be apparent from the following description when read with reference to the accompanying drawings. In the drawings, wherein like reference numerals denote the corresponding parts throughout the several views:

FIG. 1 is a partial view of an aircraft instrument panel illustrating a gyrohorizon indicator modified in accordance with the invention, and shown in association with the horizontal and vertical warning signal lights;

FIG. 2 illustrates, in side elevation and shown separately, a typical gyrohorizon indicator or artificial horizon instrument embodying the present invention;

FIG. 3 is a rear end view, on an enlarged scale and with portions broken away, of the gyrohorizon indicator shown in FIG. 1, the end cover being removed to show the fixed segmental contactor disc and the associated rotary brush or contactor disc assembly;

FIG. 4 is a vertical cross-sectional view of the modified gyrohorizon indicator, taken along the line 4—4 of FIG. 1 in the direction of the arrows and on an enlarged scale;

FIG. 5 is a fragmentary view, on an enlarged scale and with portions broken away, of the rear end spindle portion of the outer gimbal illustrating constructional details of the brush contactor disc assembled thereto and the relatively fixed segmental contact disc with which it is cooperatively associated;

FIG. 6 is an outside view of the brush contactor disc illustrated in FIG. 5, shown separately;

FIG. 7 is a top or outside view of the segmental contact disc of FIG. 5, shown separately;

FIG. 8 is a longitudinal cross-sectional view taken along the line 8—8 of FIG. 4 in the direction of the arrows and illustrating the fixed segmental contact disc and associated rotary brush contactor disc operating in response to mutual relative motion between the inner and outer gimbals and, FIG. 9 is an electrical schematic diagram of the device.

In brief, my invention provides, in combination with and as an adjunct to the usual attitude gyro-instrument 10 in an aircraft instrument panel P, visual indication of departure from reasonable limits in aircraft attitude with respect to both pitch and roll. Preferably, as illustrated in FIG. 1, "nose up" and "nose down" signal lamps 11 and 12, representative of deviations from pitch axis attitude, will be located centrally above and below, respectively, the gyrohorizon instrument 10, and the "left wing down" and "right wing down" signal lamps 13, 14, representative of deviations from roll axis attitude, will be mounted to the left and to the right, respectively, of said instrument, whereat said signal lamps will be best adapted to alert the pilot that corrective measures should be taken to maintain level flight.

Since the construction and operation of artificial horizon gyros of the type herein modified in carrying out the invention is well known, only so much of the construction of the instrument as is deemed necessary is illustrated and described herein. Thus, as illustrated in FIGS. 1 and 2, the artificial horizon gyro or gyrohorizon indicator instrument 10 comprises an instrument casing 15 in the face of which horizon bar 16 controlled by the gyro mechanism represents the horizon, and the small FIG. 17, representative of the airplane, in the center of the dial represents the aircraft. The position of the airplane symbol relative to the horizon bar indicates the actual position of the aircraft with respect to the natural horizon. Referring to FIGS. 4 and 8, the gyro mechanism by means of which the horizon bar 16 is indicative of the natural horizon comprises an inner gimbal 18 within which the gyro rotor is contained with its spin axis maintained in a horizontal position, and an outer gimbal 19 journalled for axial rotation within the instrument casing 15 and having a rear outer gimbal spindle shaft 20 extending through a rear end portion of said casing and into an airflow chamber 21. The airflow chamber 21 in the modification of the instrument in accordance with the present invention is somewhat extended in axial length by the provision of a cylindrical spacer sleeve 22 between the rear end of an instrument casing 15 and the usual airflow chamber end plate 23, to provide space for the segmental contact disc and brush contactor disc assemblage hereinafter described.

Referring now to FIGS. 4 and 5 of the drawings, a segmental contact disc support member 24 has a centrally-apertured bottom wall portion 25 circumjacent the spindle shaft 20 and affixed against the rear end wall of the instrument casing 15 as by machine screws 26. The segmental contact disc support member 24 is integrally formed with an outwardly-flared, peripheral side wall portion 27 terminating in an annular recess 28 concentric with the axis of rotation of the spindle shaft 20 and receiving, press-fitted or otherwise affixed therein, a centrally-apertured, segmental contact disc member 29. The segmental contact disc member 29 is of non-electrically conductive material, imprinted or otherwise provided on the outside with an electrically-conductive, central common contact annular ring 30 and opposed, radially outwardly spaced, arcuate contact elements 31 and 32, each of which is somewhat less than 180 circular degrees in extent. Brush means is provided for closing the electrical energizing circuit including the "left wing down" signal lamp 13 and the "right wing down" signal lamp 14 under corresponding conditions as sensed by the gyrohorizon indicator instrument 10. To this end, as best illustrated in FIGS. 3, 5 and 6, a centrally-apertured brush contactor disc 33, also of an electrically non-conductive material, is press-fitted or otherwise affixed to the outwardly-projecting end of the spindle shaft 20 in spaced relation with respect to the segmental contact disc member 29. Fixed to the brush contactor disc 33, as, for example, by extending through an opening in which it is cemented or otherwise secured in place, is a spring wire common contactor brush 34 of such length and disposition that the tip of its inner end rides on the central common contact ring 30 of the segmental contact disc member 29. Similarly, a spring wire contactor brush 35 extends through the brush contactor disc 33 to terminate in an inner end portion of such length and so disposed as to be contactable with either of the arcuate contact elements 31 and 32 of the segmental contact disc member 29, depending upon the relative rotative position of the spindle shaft 20 with respect to the instrument casing 15. It will be understood that, as illustrated in FIG. 3, when the aircraft is in level flight, irrespective of "nose up" or "nose down" attitude, as sensed by the gyrohorizon indicator instrument 10, the relative positions of the segmental contact disc member 29 and the brush contactor disc 33 are such that the arcuate contact element spring wire contactor brush 35 will lie between the free ends of the arcuate contact elements 31 and 32.

Means is also provided for closing the electrical energizing circuit including the "nose up" signal lamp 11 and the "nose down" signal lamp 12 under corresponding aircraft attitude positions exceeding predetermined limits of deviation in the pitch axis as sensed by the modified gyrohorizon indicator instrument 10. To this end, as illustrated in FIGS. 4 and 8, the outer gimbal 19 is machined to provide a circular, countersunk opening 37 providing an annular seat 38 within which is received a flanged bearing plate 39 secured in place by machine screws 40. The bearing plate 39 supports a bearing 41 within which the inner gimbal journal shaft 42 is journalled. The outside of the bearing plate 39 is formed with a first concentric annular recess 43 and a second, reduced-diameter recess 44 which, together, define an annular shoulder 45 for the reception, press-fitted or otherwise affixed therein, of a centrally-apertured, segmental contact disc member 29a similar to the above-described segmental contact disc member 29. Press-fitted or otherwise affixed to the outwardly-projecting end of the inner gimbal journal shaft 42 is a brush contactor disc 33a similar to the brush contactor disc 33 secured to the spindle shaft 20 as is hereinabove described. it is to be understood that, as is best illustrated in FIG. 4, when the aircraft is in level attitude in the pitch axis irrespective of roll or "left wing down" or "right wing down" attitude as sensed by the gyrohorizon indicator instrument 10, the relative positions of the segmental contact disc member 29a and the brush contactor disc are such that the arcuate contact element spring wire contactor brush 35a will lie between the free ends of the arcuate contact elements 31a and 32a.

Referring now to FIG. 9 and considering the electrical wiring of the device, the same comprises a ground circuit including a common ground conductor 46 connected to the negative terminal of the aircraft bettery 47. The positive or "hot" terminal of the battery 47 connects through series on-off switch 48 and conductors 49 and 50 to respective contactor brushes 35, 35a. One terminal each of the signal lamps 11, 12 connects with their respective contact elements 32a, 31a through respective conductors 51 and 52. Similarly, one terminal each of the signal lamps 13, 14 connects with their respective contact elements 31, 32 through respective conductors 53 and 54. The remaining terminals of the signal lamps 11, 12, 13 and 14 are returned to ground through respective conductors 55, 56, 57 and 58 to complete the signal lamp energization.

Audible signal means is also provided for in the circuitry to give a sound alarm at the same time that any one of the signal lamps 11, 12, 13 or 14 is energized to present a visual indication of departure beyond reasonable limits from positional attitude. To this end, a sounding device or audible alarm 59 is provided, one energization terminal of which is connected, through individual diodes 60, 61, 62 and 63, to the ungrounded terminals of each of the signal lamps 11, 12, 13 and 14 by means of individual conductors 64, 65, 66 and 67. The audible alarm device 59 is preferably of the type giving an interrupted low-pitch, high-intensity signal that commands instant attention. In operation, energization of any one of the signal lamps 11, 12, 13 and 14 also completes an energization circuit to the alarm device 59 through associated respective diodes 61, 60, 62 or 63. The diodes associated with the three remaining unenergized signal lamps block reverse current flow, to prevent improper energization of more than one signal lamp at a time. As illustrated in FIGS. 2 and 3, the internal electrical wiring of the device is terminated at a five-conductor receptacle connector 70 secured in the cylindrical spacer sleeve 22 for cable interconnection by means of a plug connector 71 to the diodes, the signal lamps, the audible alarm, the on-off switch and the aircraft battery.

While the invention is illustrated and described herein as used in conjunction with a gyrohorizon instrument, it is to be understood that the device can also be applied to other gyro-controlled instruments, such as glide-slope instruments, wherein signal lamps and/or audible signal devices can be energized as a warning upon departure from normal flight path and/or attitude of the aircraft. In brief, the invention can be applied to any and all gyro-controlled aircraft instruments to present visual or audible indication of departure from a normal flight path and/or attitude.

I claim:

1. A device for signalling departure beyond predetermined limits from straight and level flight as indicated by the dial of a gyrohorizon instrument having a casing, an outer gimbal pivotally journalled within the casing, the relative rotational position thereof, with respect to the casing, being determinative of deviation of an aircraft in the roll axis, and an inner gimbal, pivotally journalled within the outer gimbal about an axis perpendicular to the journal axis of the outer gimbal, the relative rotational position thereof, with respect to the outer gimbal, being determinative of deviation of an aircraft in the pitch axis; the combination comprising, a first pair of signal lamps indicating, when energized, "nose up" and "nose down" aircraft positional attitude, respectively, in the pitch axis, a second pair of signal lamps for indicating, when energized, "left wing down" and "right wing down" aircraft positional attitude, respectively, in the roll axis, a first means controlled by the relative position of said inner gimbal with respect to said outer gimbal for selectively energizing one or the other of said first signal lamps in accordance with corresponding "nose up" and "nose down" aircraft positional attitude, and a second means controlled by the relative position of said outer gimbal with respect to said casing for selectively energizing one or the other of said second pair of signal lamps in accordance with corresponding "left wing down" and "right wing down" aircraft positional attitude, said first pair of signal lamps being mounted directly above and below the indicating dial of the gyrohorizon instrument in an aircraft panel, and said second pair of signal lamps being mounted directly at each side of said instrument dial, said first and second energizing means including an audible signal device and means for simultaneously energizing said audible signal device upon the energization of any one of the said signal lamps, both said audible signal device and said first and second pair of signal lamps thereby serving as a warning that the aircraft has departed from safe flight parameters, said first and second pair of signal lamps also serving to indicate the direction of aircraft deviation and whether such deviation is in pitch or in roll, or both pitch and roll.

2. A device for signalling departure beyond predetermined limits from straight and level flight as defined in claim 1 wherein said first energizing means comprises a first energizing circuit for each of said first pair of signal lamps, normally open-circuit first switch means in each of said first energizing circuits, means controlled by the relative movement of said inner gimbal with respect to said outer gimbal in one direction or the other to selectively actuate said first switch means, second energizing circuits for each of said second pair of signal lamps, normally open-circuit second switch means in each of said second energizing circuits, and means controlled by the relative movement of said outer gimbal with respect to said casing in one direction or the other to selectively actuate said second switch means.

* * * * *